UNITED STATES PATENT OFFICE.

JOSEF HOUBEN, OF BERLIN, GERMANY, ASSIGNOR TO THE FIRM OF J. D. RIEDEL AKTIENGESELLSCHAFT, OF BERLIN-BRITZ, GERMANY.

PROCESS FOR THE MANUFACTURE OF NITROSO DERIVATIVES OF PHENYL-GLYCIN-ORTHO-CARBOXYLIC ACID.

1,079,246.  Specification of Letters Patent.  Patented Nov. 18, 1913.

No Drawing.  Application filed July 18, 1912.  Serial No. 710,300.

*To all whom it may concern:*

Be it known that I, JOSEF HOUBEN, manufacturing chemist, subject of the German Emperor, residing at Berlin, Germany, have invented a certain new and useful Process for the Manufacture of Nitroso Derivatives of Phenyl-Glycin-Ortho-Carboxylic Acid, of which the following is a specification.

According to the observations made by O. Fischer and his pupils nitrosamins of secondary arylamins, such as the nitrosamin of methylanilin for example, can be rearranged by alcoholic hydrochlorid or hydrobromid in the following manner:—

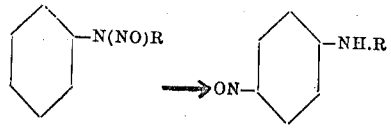

Subsequently I and my collaborators discovered other agents for re-arranging the above compounds, such agents being hydrochloric acid in glacial acetic acid and particularly fuming hydrochloric acid and we showed, that secondary arylamins or derivatives thereof, when dissolved in fuming hydrochloric acid, can be directly converted with nitrites or nitrous acid into nucleus-nitroso compounds, the nitroso group entering the para position, which is the one preferred in the Fischer-Hepp conversion also.

Now I have found, that phenyl-glycin-orthocarboxylic acid and also its acid and neutral esters may be converted in very high yield into nucleus-nitroso derivatives, if nitrous acid or nitrites be allowed to act upon the solution or suspension of the aforesaid substances in fuming hydrochloric acid. This was not to be foreseen, because the $CH_2.COOH$ group in conjunction with the carboxyl in the ortho position causes the basic character of the amino group to disappear, in such a manner, that the phenyl-glycin-ortho-carboxylic acid scarcely dissolves in dilute hydrochloric acid. Whereas O. Fischer and Hepp therefore did not succeed in converting the nitrosamin of phenyl-glycin into a nucleus-nitroso compound by means of alcoholic hydrochloric acid, phenyl-glycin-ortho-carboxylic acid and its esters can be readily transformed into nucleus-nitroso compounds in the presence of fuming hydrochloric acid, when they are treated with nitrous acid. Nucleus-nitroso derivatives of ethylene-dianthranilic acid can also be prepared in an exactly similar manner. The above mentioned nitroso compounds are intended to be used as starting materials for the preparation of phenazin and phenoxazin dye stuffs and derivatives of indigo.

Example: A solution of 5 parts of phenyl-glycin-ortho-carboxylic acid in fuming hydrochloric acid is cooled by ice and mixed with 1.8 parts of finely powdered sodium-nitrite. It is then allowed to stand in the cold, until the yellow precipitate, which is thrown down, no longer increases. The precipitate is then filtered off by suction and mixed in aqueous solution with one equivalent of soda, just sufficient for neutralizing all the hydrochloric acid. The para-nitroso-phenyl-glycin-ortho-carboxylic acid is obtained in good yield in the form of a dark green powder. This substance has the following formula:

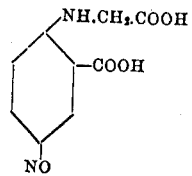

What I claim is:—

1. The process for the manufacture of nucleus-nitroso derivatives of phenyl-glycin-ortho-carboxylic acid, which consists in treating said acid with nitrous acid in the presence of fuming hydrochloric acid, substantially as described.

2. The process for the manufacture of para-nitroso-phenyl-glycin-ortho-carboxylic acid, which consists in cooling a solution of phenyl-glycin-ortho-carboxylic acid in fuming hydrochloric acid, mixing it with sodium nitrite, allowing the mixture to stand and form a precipitate, filtering the precipitate, and mixing it in aqueous solution with soda, substantially as described.

In testimony whereof I have hereunto set my hand in presence of two subscribing witnesses.

Dr. JOSEF HOUBEN.

Witnesses:
Dr. FELIX SOLMEIDER,
JACOB MEYER.